Jan. 22, 1963 M. T. TERRY 3,075,052

METHODS OF PRODUCING GROOVED RECORDS

Filed May 5, 1958 3 Sheets-Sheet 1

Inventor
M. T. Terry
By Glascock Downing & Seebold
Attys

Inventor
M. T. Terry
By Glascock Downing & Seebold
Attys.

Inventor
M. T. Terry
By Glascock Downing & Seebold
Attys

United States Patent Office 3,075,052

Patented Jan. 22, 1963

3,075,052

METHODS OF PRODUCING GROOVED RECORDS

Michael Treacher Terry, St. Albans, England, assignor to Electric & Musical Industries Limited, Hayes, England, a company of Great Britain Filed May 5, 1958, Ser. No. 733,103
Claims priority, application Great Britain May 9, 1957
12 Claims. (Cl. 179—100.4)

Figure 1:
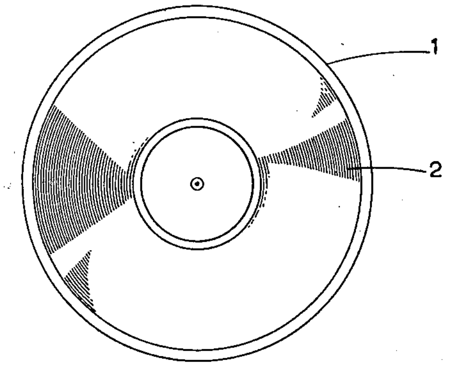

This invention relates to methods of producing grooved records.

It is well known in connection with grooved records such as disc gramophone records, to vary the pitch or spacing between the turns of the groove in accordance with the amplitude of lateral excursions of the groove so as to effect economy in the recording space.

It is moreover, frequently desirable to vary the depth of cut of the groove so as to form a complex cut groove in which said groove is modulated in two mutually perpendicular directions such as by hill and dale (vertical) and lateral modulations for example. In the case of a record having only a laterally modulated groove it is sometimes desirable also to vary the depth of cut in order to reduce the danger of a reproducing stylus leaving the groove. Since a groove usually has a V-shaped cross section it will be appreciated that the deeper the cut the wider will be the groove at the surface of the record. If the groove spacing is kept constant or varied only with the amplitude of the lateral excursions of the groove as described above, it must be sufficient to accommodate the deepest required cut so that the wall between adjacent turns of the groove is always sufficiently thick. Thus when the depth of cut of adjacent turns of the groove is small the wall between said turns frequently is thicker than is reasonably necessary.

An object of the present invention is to provide an improved grooved record having lateral modulation and in which the depth of cut of the groove is varied and whereby the length of playing time can be increased.

According to one feature of the invention there is provided a grooved record when made by a method comprising modulating said groove with lateral modulation and a varying depth of cut and varying the spacing between adjacent groove portions in accordance with a first variable which is dependent upon and varies in the same sense as the amplitude of said lateral modulation and a second variable which is dependent upon and varies in the same sense as said depth of cut, whereby the groove spacing tends to be increased with increase in amplitude of said lateral modulation and also tends to be increased with increase in said depth of cut.

According to another feature of the invention there is provided apparatus for producing a grooved record having lateral modulation and a varying depth of cut, comprising means for varying the spacing between adjacent groove portions in accordance with a first variable which is dependent upon and varies in the same sense as the amplitude of said lateral modulation and a second variable which is dependent upon and varies in the same sense as said depth of cut, whereby the groove spacing tends to be increased with increase in amplitude of said lateral modulation and also tends to be increased with increase in said depth of cut.

The invention is applicable to a simple laterally modulated grooved record in which the depth of cut is varied so as to be changed as for example as a function of the stylus acceleration or velocity, these being related to both amplitude and frequency of the recorded signal. The invention is also applicable to a grooved record having a complex modulation such as combined lateral and hill and dale modulations or two substantially mutually perpendicuar modulations which may each be at 45° to the record surface.

The groove spacing can be controlled in accordance with the present invention either manually or automatically. By way of example two electrical control signals can be derived respectively dependent upon the amplitude of the lateral excursions and depth of cut of the groove. Preferably said signals are derived from a pick-up head which is adapted to track the groove of a record or a magnetic wire or tape from which the signals to be recorded are derived, in advance of the pick-up head from which the cutting signals are derived.

Figure 2:
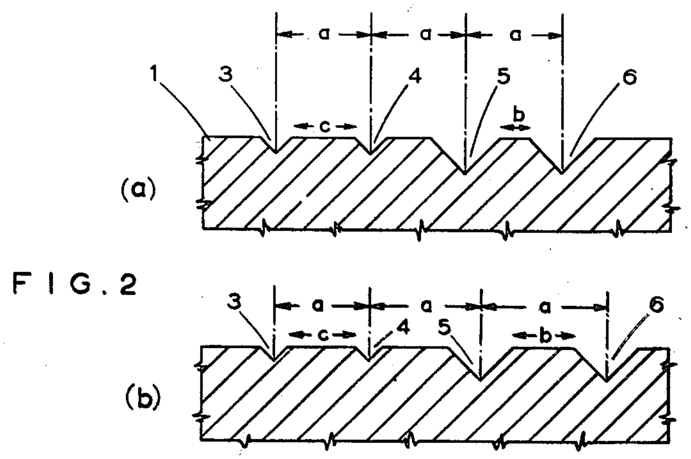
Figure 4:
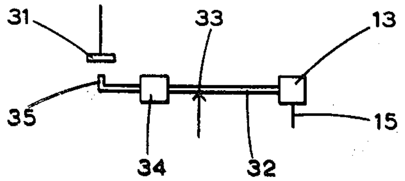
Figure 3:
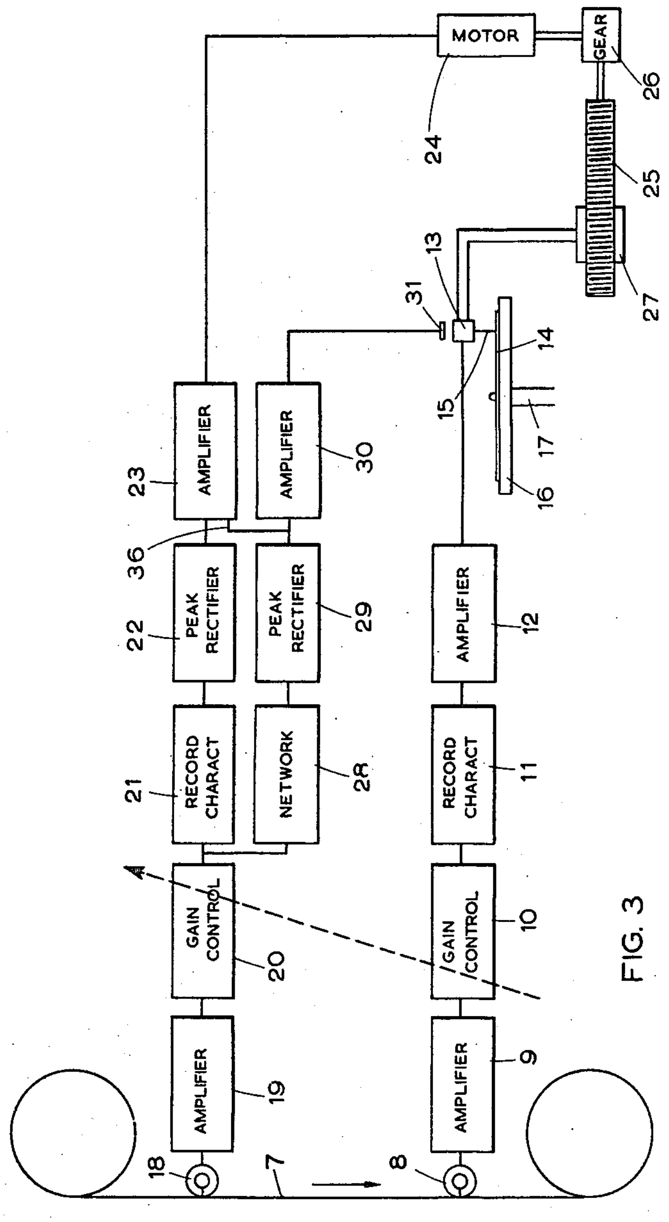
Figure 5:
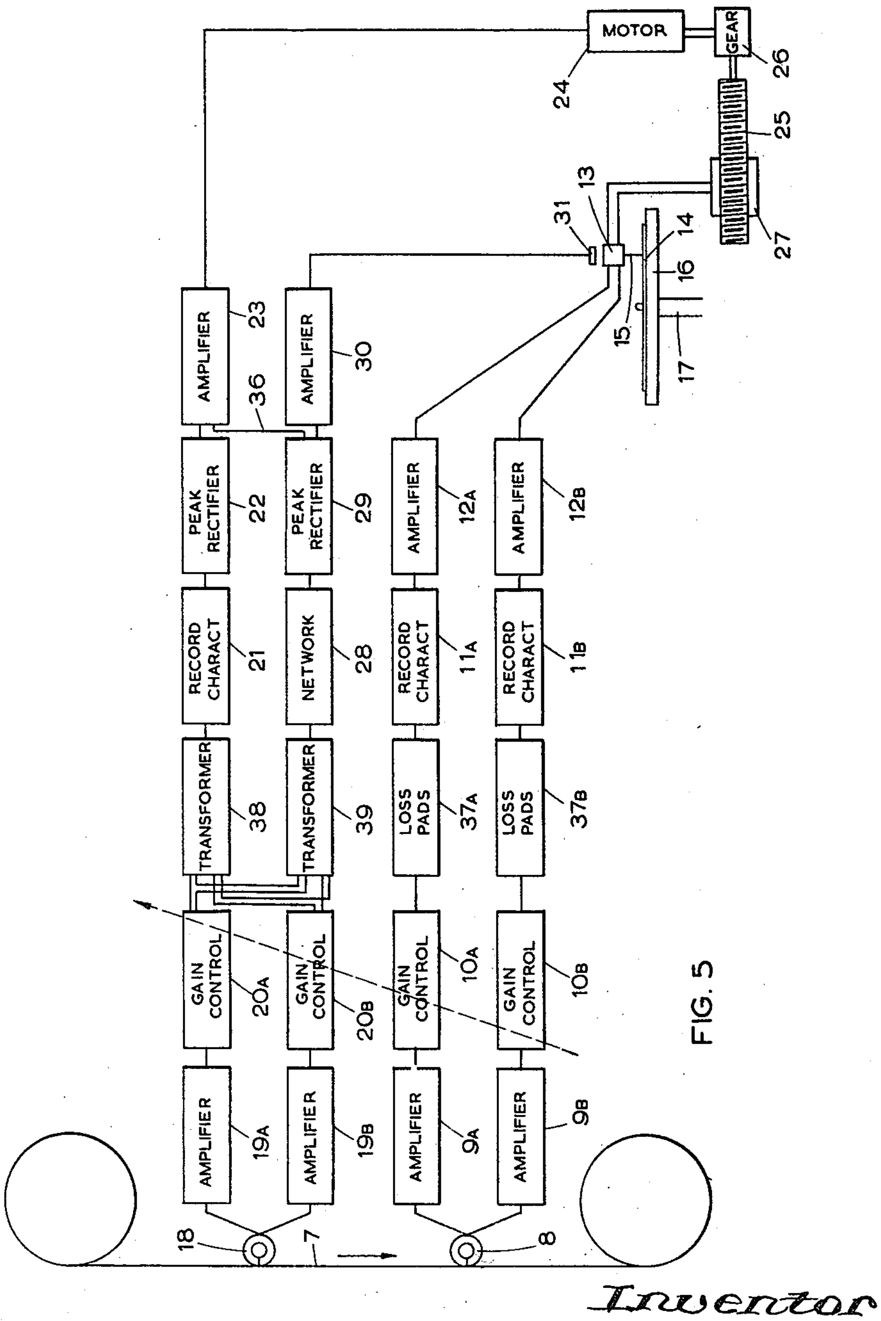

In order that the present invention may be clearly understood and readily carried into effect, it will now be more fully described with reference to the accompanying drawings, in which:

FIGURE 1 is a plan view of a grooved record in the form of a disc having a spiral groove, FIGURE 2*a* is a cross section on an enlarged scale of a portion of the record of FIGURE 1, FIGURE 2*b* is a cross section on an enlarged scale of a portion of a record in accordance with an embodiment of the invention, FIGURE 3 illustrates in schematic form apparatus for recording signals on a grooved record in accordance with an embodiment of the invention, FIGURE 4 shows a detail of the apparatus of FIGURE 3, and FIGURE 5 illustrates in schematic form apparatus for recording signals on a grooved record in accordance with another embodiment of the invention.

Referring to FIGURES 1 and 2*a* there is shown a grooved record in the form of a disc 1 having a spiral groove 2, a portion only of which is shown in FIGURE 2*a*. In FIGURE 2*a* there is shown a cross section along a portion of a diameter of the disc 1 showing a section of four turns 3, 4, 5 and 6 of the groove 2. Only one side of the disc 1 is shown although usually said disc 1 will have a second spiral groove on the reverse side thereof. As shown in FIGURE 2 the depth of cut of the groove 2 varies therealong. Thus in the section shown the turns 3 and 4 have a smaller depth of cut than the turns 5 and 6. This may be due to complex modulation of the groove 2 such as simultaneous hill and dale and lateral modulation or to modulation for example in two mutually perpendicular directions each at an angle of 45° to the recording surface, or may be due to variations in the depth of cut applied in accordance with the acceleration or velocity for example of the groove 2. By way of illustration of the function of the invention the cross section of FIGURE 2*a* shows adjacent turns of the groove 2 equally spaced along a diameter of the record. Thus the groove spacing or pitch, that is to say the distance between the apices of each pair of adjacent turns is equal to $a$. However by virtue of the fact that the groove turns 5 and 6 are cut deeper than turns 3 and 4 and that said cuts are V-shaped the width of the groove of the turns 5 and 6 at the surface of the record 1 is greater than the width of the groove of the turns 3 and 4 at the surface of the record. Hence the average thickness of the wall at the surface of the record between adjacent turns varies in the present example from a minimum $b$ between turns 5 and 6 to a maximum $c$ between turns 3 and 4. It will be appreciated that if the separation between adjacent turns is maintained constant at $a$, and $a$ is chosen to be sufficiently large to ensure that the smallest value $b$ of the average wall thickness between turns does not fall below a predetermined minimum then the average thickness $c$ of the wall is larger than necessary and causes a waste in recording space. If alternatively the larger average thickness $c$ is made just equal to the desirable thickness, the average thickness $b$ will be too small and hence adjacent turns may intersect. In order to obviate such disadvantages the groove spacing in accordance with the present invention is varied in accordance with and in the same sense as variations in both the amplitude of the lateral modulation and the depth of cut. As a result the average wall thickness can be made constant at a minimum thickness compatible with adequate wall strength.

Referring to FIGURE 3 the invention is shown as applied to a method of forming a grooved record in the form of a disc in which said groove is modulated with lateral modulations and the depth of cut of the groove is varied in accordance with either the amplitude, velocity or acceleration of the lateral excursions of the groove or in accordance with any combination of two or all of amplitude, velocity and acceleration. It will be appreciated that velocity and acceleration are respectively the first and second derivatives of amplitude.

The signals to be recorded are derived from a magnetic tape or wire 7 by means of a reproducing magnetic head 8, said tape or wire being driven in the direction of the arrow. The signals are amplified by amplifier 9 and then applied to gain control means 10 after which they are applied to an electrical network 11 for introducing the required recording characteristic. As is well known it has been found desirable to record signals in a grooved record with a special characteristic details of which are contained in British Standards Specification No. B.S. 1928: 1955, and the network 11 is arranged to effect the required control to produce recording signals in accordance with these standards. The output signals from the network 11 are applied via an amplifier 12 to a cutting head for the record 14 so as to cause a cutting stylus 15 mounted on said head 13 to produce a groove in the record 14 laterally modulated in accordance with said signals. The record 14 is supported on a turntable 16 which is mounted on a spindle 17 rotatable at a constant speed.

In advance of the magnetic head 8 there is provided a further magnetic reproducing head 18 for deriving signals to control the depth of cut of the groove in record 14 and also the separation or spacing between adjacent turns of said groove. As in the case of the head 8, the head 18 is connected to an amplifier 19 and gain control means 20 the latter being ganged with the gain control means 10 as indicated. The output signal from gain control means 20 is applied to a circuit arrangement comprising a network 21 from which an output is obtained proportional to the amplitude of the modulation of the groove which results from the modulating signal applied to the cutting head 13. Such an output can be obtained by including in the network 21 a network identical to the network 11 together with an integrating circuit on the assumption that the cutting head 13 is a device which produces a mechanical stylus velocity which is proportional to the amplitude of the applied voltage from amplifier 12. This output is rectified in a peak rectifier 22, associated with a suitable storage circuit and amplified by a D.C. amplifier 23, after which it is applied to an electric motor 24 the speed of which is variable in accordance with the D.C. control signal fed thereto from the amplifier 23. The motor 24 rotates a lead screw 25 via a reduction gear 26 thereby moving a nut 27 in engagement with the screw 25 rectilinearly. The nut 27 is coupled to the cutting head 13 so that movement of the nut 27 imparts to the head 13 radial movement across the record 14. If the speed of the motor 24 remains constant a spiral groove of constant pitch and therefore constant spacing between turns will be cut in the surface of the record 14, but acceleration of the motor 24 will result in increasing spacing between the turns of the groove and deceleration of the motor 24 will cause the groove spacing to be reduced. The control signal is fed to the motor 24 in such a sense that the groove spacing increases with increase in amplitude of the signal being recorded and decreases as said amplitude decreases. Variation of groove spacing in dependence upon the depth of cut is achieved in a manner to be described hereinafter.

The output signal from the gain control means 20 is also fed to an electrical network 28 which introduces into the signal fed thereto a characteristic similar to the recording characteristic and from which a signal representative of the desired depth of cut for the particular characteristics of the signal to be recorded is derived. The representative signal is rectified by a peak rectifier 29, associated with a suitable storage circuit the output from which is fed through an amplifier 30 to a coil 31 so as to influence the depth of cut produced by the cutting stylus 15. The representative signal may be dependent on the amplitude of the signal being recorded in which case the network 28 will include an integrating stage the output from which is fed to the rectifier 29. If the representative signal is dependent on velocity the integrating stage in the network 28 is omitted and if said signal is dependent on acceleration said network will include instead of an integrating stage a differentiating stage. The representative signal may be made dependent on a combination of any two or all of amplitude, velocity or acceleration if desired over different parts of the frequency band of the recorded signals. The manner in which the output of the amplifier 30 controls the depth of cut is shown in detail in FIGURE 4 which is a view of the cutting head 13 perpendicular to the view thereof shown in FIGURE 3. As shown the cutting head 13 is mounted on an arm 32 pivoted at a point 33, and a counterbalancing weight 34 for said cutting head 13 is also mounted on the arm 32. The end of the arm 32 remote from the cutting head 13 is provided with an armature 35 and the coil 31 is arranged so as to be close to but spaced from the armature 35. Thus when a current flows thhrough the coil 31 the armature 35 is attracted towards said coil 31. The angle through which the arm 32 is moved in this manner is dependent upon the amplitude of the current in the coil 31 so that an increase in said amplitude causes an increase in the depth of cut of the groove and vice versa.

As described with reference to FIGURE 2, when the depth of cut is varied the width of the groove at the record surface is varied correspondingly. In the embodiment of the invention shown the motor 24 has additionally applied thereto a signal dependent upon the depth of cut so that the spacing of the turns of the groove is also controlled in dependence upon the depth of cut. For this purpose a suitable proportion of the output signal from the rectifier 29 is applied to the amplifier 23 via a lead 36, so as to be added to the rectified signal from rectifier 22. Thus it will be appreciated that when the lateral amplitude increases the groove spacing tends to be increased and also when the depth of cut increases the groove spacing tends to be increased. Hence if both lateral amplitude and depth of cut increase coincidentally or if one increases and the other remains constant the groove spacing will be increased. In an extreme case it may happen that lateral amplitude increases whilst depth of cut decreases or vice versa, in which case the two effects may cancel each other, causing the groove spacing to remain constant, or one may override the other, causing the groove spacing to be varied in the same sense as the overriding effect.

The storage circuits associated with the rectifiers 22 and 29 are preferably such as to charge rapidly and discharge slowly. The magnetic head 18 as aforesaid is arranged to read information from the tape or wire 7 and interval of time before the same information is read by the head 8, and preferably said interval of time is slightly longer than the time of one half of a revolution of the disc 14. Thus the information imparted to the motor 24 to control the separation of turns of the groove is received in advance of the actual cutting of the relevant turns. An increase in the speed of the motor 24 should be maintained for the time of half a revolution of the disc 14 after the particular modulation concerned has been cut so that said speed should be constant at the increased speed for a total time equal to about the time of one revolution of the disc 14. Hence the discharge time constant of the rectifier 22 should be long compared with the time of a revolution of disc 14, this time being 1.8 secs. when the speed is 33⅓ revolutions per minute. The same applies to the storage circuit associated with the rectifier 29 since the current in coil 31 should also remain substantially constant for a finite length of time similarly to the current applied to motor 24. When such high time constants are involved the discharge time during high amplitude signals is very long and may result in tool large a separation between turns so that recording space is wasted. It is therefore desirable to incorporate in association with the storage circuits of the rectifiers 22 and 29 an auxiliary circuit arrangement which suitably reduces the discharge time constant whenever there is an interval of more than a predetermined time during which the signal amplitude does not exceed a predetermined value. For this purpose a self rectifying thyratron may, for example, be provided arranged to conduct whenever a control signal fed to said thyratron from a cathode follower coupled to the rectifier 22 or 29, falls below a chosen maximum value. If signals below this maximum value are maintained for more than a certain length of time such as two seconds, a flip flop circuit coupled to the thyratron functions to apply a short circuit across the long time constant of the storage circuit associated with the relevant rectifier so that the control voltage falls rapidly and consequently the groove spacing is rapidly reduced to its minimum value.

The invention as stated above is also applicable to complex cut records and FIGURE 5 illustrates a method of forming a grooved record in the form of a disc in which said groove is modulated with two mutually perpendicular modulations which in the present embodiment are each inclined at 45° to the surface of the record. Like references are used in FIGURE 5 for parts analogous to those in FIGURE 3 although in the present embodiment it will be appreciated that the output signals from the two magnetic heads 8 and 18 comprise two components corresponding to the two mutually perpendicular modulations, the channels for said two components being designated channel A and channel B respectively. Signals from the magnetic head 8 are applied via the aforesaid two channels to the cutting head 13 so as to regulate movement of the stylus 15 in two mutually perpendicular directions which are each inclined at 45° to the surface of the disc 14. In addition to the electrical circuits shown in FIGURE 3 loss pads 37A and 37B are included for a purpose which will hereafter be explained.

Signals from the magnetic head 18 are applied to amplifiers 19A and 19B and gain control means 20A and 20B ganged with gain control means 10A and 10B, the signals in the two channels A and B corresponding respectively to the two mutually perpendicular components of groove modulation. These signals are then applied to sum and difference transformers 38 and 39. The windings of the two transformers 38 and 39 are so phased that the output from transformer 38 is related to the lateral component of the groove modulation and the output from the transformer 39 is related to the vertical component of the groove modulation, the latter being of course related to the depth of cut. It will be appreciated that small losses may be characteristic of the transformers 38 and 39, and in order to ensure that similar losses take place also in the channels from the magnetic head 8, the loss pads 37A and 37B are provided. Outputs from transformers 38 and 39 are applied via circuit arrangements similar to those described with reference to FIGURE 3 to amplifiers 23 and 30 respectively. The output from amplifier 23 is applied to the motor 24 to control the speed of rotation of the lead screw 25 and thereby the separation between adjacent turns of the groove in the manner hereinbefore described. It will be appreciated that due to the complex cut the depth of the cut varies instantaneously but it is also preferred to vary the average depth of cut in order that the average depth will always be sufficient to accommodate the vertical excursions of the groove. For this purpose the output from amplifier 30 controls the average depth of cut in a manner similar to that described with reference to FIGURE 4. A suitable proportion of the output from the rectifier 29, is applied to amplifier 23 via lead 36 so as to introduce a component dependent upon the average depth of cut into the control signal which determines the spacing of adjacent turns of the groove.

It will be appreciated that the average depth of cut control produced by coil 31 is a position control, that is to say it determines the vertical mean position of the cutting stylus 15 whereas the component of the control for separation of adjacent turns of the groove derived from the depth of cut via the lead 36 is a velocity control inasmuch as it determines the velocity with which said cutting stylus 15 traverses the disc 14 in the radial direction. It is therefore desirable to employ a delay in the depth of cut control. This should preferably operate so as to apply the required depth control signal to the coil 31 only just before the signal concerned is applied to the cutting head 13, and may for example be derived by means of an additional magnetic head and associated channel disposed just before the head 8 in the path of the tape or wire 7, in which case, the head 18 and its associated channels 19, 20, 21, 22 and 23 will provide signal information for controlling only the separation of the turns of the groove.

In a well known arrangement of determining the depth of cut of a cutting stylus instead of mounting said stylus on an arm pivoted about a point and provided with a suitable counterbalancing member as described and illustrated in FIGURE 4, the stylus is preceded by a member such as a ball which is mounted on the cutting head 13 and which moves on the surface of the record in advance of the stylus at a certain vertical distance above the stylus. This vertical distance determines the depth of cut, and in this case it will be understood that the arrangement of FIGURE 4 in which the coil 31 is capable of attracting the arm 32 on which the cutting head 13 is mounted will be replaced by other means for varying the aforementioned vertical separation of cutting stylus and said member such as a ball. The control means for the depth of cut will thus be arranged to vary the vertical position of said member and can be in the form of an electromagnetic system mounted on the cutting head or a remote control system such as a hydraulic system. Alternatively a flexible drive may be employed.

In the embodiments of the invention described variation of the spacing between adjacent turns of the groove is effected automatically. Alternatively said variation may be effected manually, signals dependent upon amplitude of lateral modulation and depth of cut being applied to a suitable meter to give a visual indication. Preferably the meter is calibrated in terms of the groove spacing or the number of grooves per inch so as to enable an operator to effect suitable adjustments as to provide to the required groove spacing.

Although the invention has been described with particular reference to a record in the form of a disc having a spiral groove it is equally applicable to other forms of grooved record, such as a grooved tape or drum.

What I claim is:

1. Apparatus for producing a grooved record having lateral modulation and a varying depth of cut comprising means for deriving first signals for modulating said groove with lateral modulation and varying depth of cut, means for deriving second signals representative of said first signals but advanced in time relatively thereto, means for employing said first signals to modulate said groove both laterally and vertically, means for deriving from said second signals a spacing control signal having a component dependent upon the amplitude of said lateral modulation and a component dependent upon said depth of cut, and means for employing said spacing control signal to vary the spacing between adjacent groove portions, whereby the groove spacing tends to be increased with increase in amplitude of said lateral modulation and also tends to be increased with increase in said depth of cut.

2. Apparatus for producing a grooved record having lateral modulation and a varying depth of cut comprising means for deriving first signals for modulating said groove with lateral modulation and varying depth of cut, means for deriving second signals representative of said first signals but advanced in time relatively thereto, means for employing said first signals to modulate said groove both laterally and vertically, means for deriving from said second signals a depth of cut control signal dependent upon at least one of the amplitude, velocity and acceleration of said lateral modulation, means for employing said depth of cut control signal to vary said depth of cut, means for deriving from said second signals a spacing control signal having a component dependent upon the amplitude of said lateral modulation and a component dependent upon said depth of cut, and means for employing said spacing control signal to vary the spacing between adjacent groove portions, whereby the groove spacing tends to be increased with increase in amplitude of said lateral modulation and also tends to be increased with increase in said depth of cut.

3. Apparatus for producing a grooved record having lateral modulation and a varying depth of cut comprising means for deriving first signals for modulating said groove with lateral modulation and varying depth of cut, means for deriving second signals representative of said first signals but advanced in time relatively thereto, means for employing said first signals to modulate said groove both laterally and vertically, means for deriving from said second signals a depth of cut control signal dependent upon at least one of the amplitude, velocity and acceleration of said lateral modulation, means for employing said depth of cut control signal to vary said depth of cut, means for deriving from said second signals a component signal dependent upon the amplitude of said lateral modulation, means for deriving a spacing control signal from said component signal and said depth of cut control signal, and means for employing said spacing control signal to vary the spacing between adjacent groove portions, whereby the groove spacing tends to be increased with increase in amplitude of said lateral modulation and also tends to be increased with increase in said depth of cut.

4. Apparatus for producing a grooved record having modulation in two different directions at opposite equal angles to the grooved surface of said record, comprising means for deriving two first signals for modulating said groove in two different directions with modulation having a lateral component and a varying depth of cut, means for deriving two second signals respectively representative of said two first signals but advanced in time relatively thereto, means for employing said two first signals to modulate said groove respectively in two directions, means for deriving from said two second signals one signal which is related to the lateral component of said modulation and another signal which is related to the depth of cut of said groove, means for deriving an average depth of cut control signal from said another signal, means for employing said average depth of cut control signal to vary the average depth of cut of said groove, means for deriving from said one signal and said average depth of cut control signal a spacing control signal, and means for employing said spacing control signal to vary the spacing between adjacent groove portions, whereby the groove spacing tends to be increased with increase in amplitude of said lateral component and also tends to be increased with increase in said average depth of cut.

5. Apparatus according to claim 4 in which said means for deriving said one and another signal comprises sum and difference transformers.

6. Apparatus according to claim 5 including means for introducing losses into said first signals related to losses in said second signals due to said sum and difference transformers.

7. Apparatus for producing a grooved record having lateral modulation and a varying depth of cut, comprising means for varying the spacing between adjacent groove portions in accordance with a first variable which is dependent upon and varies in the same sense as the amplitude of said lateral modulation and a second variable which is dependent upon and varies in the same sense as said depth of cut, whereby the groove spacing tends to be increased with increase in amplitude of said lateral modulation and also tends to be increased with increase in said depth of cut.

8. Apparatus for producing a grooved record comprising means for providing in a record surface a groove having lateral modulation, means for varying the depth of cut of said groove in dependence upon at least one of the amplitude, velocity and acceleration of said lateral modulation, and means for varying the spacing between adjacent groove portions in accordance with a first variable which is dependent upon and varies in the same sense as the amplitude of said lateral modulation, and a second variable which is dependent upon and varies in the same sense as said depth of cut, whereby the groove spacing tends to be increased with increase in amplitude of said lateral modulation and also tends to be increased with increase in said depth of cut.

9. Apparatus for producing a grooved record comprising means for providing in a record surface a groove modulated in two directions respectively in accordance with two signals, and means for varying the spacing between adjacent groove portions in accordance with a first variable which is dependent upon and varies in the same sense as the amplitude of the lateral component of the groove modulation, and a second variable which is dependent upon and varies in the same sense as the amplitude of the vertical component of said groove modulation, whereby the groove spacing tends to be increased with increase in amplitude of said lateral component and also tends to be increased with increase in amplitude of said vertical component.

10. Apparatus according to claim 9 comprising means for providing in said record surface a groove modulated with lateral modulation and hill and dale modulation respectively in accordance with two signals.

11. Apparatus according to claim 9 comprising means for providing in said record surface a groove modulated in two mutually perpendicular directions each at approximately 45° to said surface respectively in accordance with two signals.

12. A record having a spiral groove which is laterally and vertically modulated adjacent groove portions being spaced in accordance with a first variable which is dependent upon and varies in the same sense as the amplitude of said lateral modulation and a second variable which is dependent upon and varies in the same sense as said depth of cut, whereby the groove spacing tends to be increased with increase in amplitude of said lateral modulation and also tends to be increased with increase in said depth of cut.

References Cited in the file of this patent

UNITED STATES PATENTS

| | | |
|---|---|---|
| 2,112,699 | Kleber | Nov. 29, 1930 |
| 2,014,528 | Keller | Sept. 17, 1935 |
| 2,284,744 | Kellogg | June 2, 1942 |
| 2,738,385 | Bachman | Mar. 13, 1956 |
| 2,838,599 | Hardi | June 10, 1958 |
| 2,847,514 | Evans | Aug. 12, 1958 |
| 2,963,556 | Redlich | Dec. 6, 1960 |
| 2,977,424 | Redlich | Mar. 28, 1961 |